United States Patent [19]

Hansen et al.

[11] Patent Number: 4,893,909
[45] Date of Patent: * Jan. 16, 1990

[54] MAGNETO-OPTICAL LIGHT SWITCHING ELEMENT AND METHOD OF MANUFACTURING SAME

[75] Inventors: Peter Hansen, Appen; Claus-Peter Klages, Hamburg; Klaus-Peter Schmidt, Quickborn; Wolfgang F. M. Tolksdorf, Tornesch; Klaus Witter, Hamburg, all of Fed. Rep. of Germany

[73] Assignee: U.S. Philips Corp., New York, N.Y.

[*] Notice: The portion of the term of this patent subsequent to Sep. 13, 2005 has been disclaimed.

[21] Appl. No.: 21,109

[22] Filed: Mar. 3, 1987

[30] Foreign Application Priority Data

Mar. 6, 1986 [DE] Fed. Rep. of Germany ....... 3607346

[51] Int. Cl.$^4$ ........................... G02F 1/01; G02B 5/30
[52] U.S. Cl. ...................... 350/377; 350/355
[58] Field of Search ............. 350/375, 376, 377, 355; 156/DIG. 63

[56] References Cited

U.S. PATENT DOCUMENTS

| 3,787,825 | 1/1974 | De Jonge | 350/376 |
| 4,082,424 | 4/1978 | Sauter et al. | 350/375 |
| 4,273,609 | 6/1981 | Nelson et al. | 156/DIG. 63 |
| 4,379,853 | 4/1983 | Mateika et al. | 423/263 |
| 4,500,177 | 2/1985 | MacNeal | 350/376 |
| 4,544,239 | 10/1985 | Shone et al. | 350/376 |
| 4,578,651 | 3/1986 | Heitman et al. | 350/375 |
| 4,770,504 | 9/1988 | Hansen et al. | 350/377 |

FOREIGN PATENT DOCUMENTS

| 0061743 | 10/1982 | European Pat. Off. | 350/375 |
| 168622 | 12/1981 | Japan | 350/375 |

OTHER PUBLICATIONS

"Journal of Crystal Growth", 64 (1983) pp. 275–284.
"Valvo Technische Information", TI 840716.
Geiss et al., "Single Rare Earth Garnet Films for Bubble Domains", 12/71, IBM Technical Disclosure Bulletin, V. 14, No. 7, p. 2221.
Ahn et al., "Increase of Faraday Rotation in Magneto-Optic Films", 12/71, IBM Technical Disclosure Bulletin, V. 14, No. 7, p. 2222.

Primary Examiner—Bruce Y. Arnold
Assistant Examiner—Terry S. Callaghan
Attorney, Agent, or Firm—William L. Botjer

[57] ABSTRACT

A magneto-optical light switching element comprising islands which are formed from an epitaxial layer on the basis of bismuth-substituted rare earth metal iron garnet, which layer is provided on a nonmagnetic, optically transparent garnet substrate, integrated heating resistors being provided on the islands which are surrounded by a coil, the substrate being (100)-oriented and the coil being constructed as an integrated coil.

18 Claims, 3 Drawing Sheets

MAGNETO-OPTICAL LIGHT SWITCHING ELEMENT AND METHOD OF MANUFACTURING SAME

BACKGROUND OF THE INVENTION

The invention relates to a magneto-optical light switching element comprising islands which are formed from an epitaxial layer on the basis of bismuth-substituted rare earth metal iron garnet, which layer is provided on a magnetically unordered and optically transparent garnet substrate, integrated heating resistors being provided on the islands which are surrounded by a coil.

The invention further relates to a method of manufacturing such a magneto-optical light switching element and to its use.

For processing texts, graphs and pictures ever more use is made of electronic data processing. To output the information, fast, high-resolution printers such as, for example, electrophotographic printers having optical printing heads are used.

In Technische Information 84 07 16 published by Valvo, a magneto-optical light switching module is described which can suitably be used for the formation of such compact, optical, high-resolution printing heads.

The known modules contain a series of punctiform light switching elements which can independently be switched between a transparent and an opaque condition in a thermo-magnetic way.

In the manufacture of the light switching elements a (111)-oriented monocrystalline substrate of substituted gadolinium-gallium-garnet is employed. A layer of bismuth-substituted rare earth metal-iron-garnet of the qualitative composition $(Gd,Bi)_3(Fe,Ga,Al)_5O_{12}$ is applied to this substrate by means of epitaxy. Such layers and substrates are known from J. Cryst. Growth 64 (1983), pages 275 to 284. In order to obtain single light switching elements, most of the magneto-optical layer initially covering the entire substrate is removed by means of a photolithographic mask-etching process, so that only single islands remain. Each island forms the basis of a light switching element. In a further masking process the interval between the light switching elements is covered with an opaque layer. Thus, only the light switching elements pass light. During the time that the substrate is not ordered magnetically and is optically inactive, the magneto-optical layer exhibits a spontaneous magnetisation which due to the non-statistic distribution of the bismuth irons in the crystal lattice is always oriented perpendicularly to the layer surface, i.e. the magnetisation can only have two directions: either parallel or antiparallel to the normal to the layer.

When linearly polarised light passes through this layer, the plane of polarisation of this light is rotated either clockwise or anti-clockwise, dependent upon the direction of magnetisation, due to the Faraday effect. This rotation of the plane of polarisation is converted to an intensity modulation by a polarisation-sensitive optical system. For this purpose the layer is arranged between two polarising foils, i.e. foils which only transmit light of a predetermined plane of polarisation. The first foil (polariser) is used to filter linearly polarised light from incident light, and the second foil (analyser) is used to block the light of one of the planes of polarisation. Light whose plane of polarisation corresponds to the other direction of magnetisation is transmitted by the light switching elements. Consequently, a reversal of the direction of magnetisation leads to a change-over from the opaque to the transparent condition or conversely.

So long as the dimensions of the light switching element do not exceed a certain critical value of approximately 500 $\mu$m, a uniform direction of magnetisation is always formed within the light switching element; with light switching element dimensions in the range below 100 $\mu$m, as they are used for printing head applications, the direction of magnetisation is very stable.

On the other hand, the directional stability of the magnetisation is dependent upon the temperature, at temperatures over 150° C. the stability decreases drastically. This effect is used for switching. To this end, a resistor element is provided by means of the thin-film technology in one corner of each light switching element and is connected via a track network to an electronic drive circuitry. Moreover, a coil formed of a readily conceived wire turn is arranged so that it surrounds all light switching elements of a light switching array. A light switching element is switched by applying a current impulse of approximately 15 $\mu$s to the resistor. Consequently, the temperature in the vicinity of this resistor element (heating element), rises to over 150° C., thereby strongly reducing the magnetisation stability in the material below the resistor element. By means of the coil a magnetic field of approximately 20 kA/m is then produced for approximately 10 $\mu$s. Under the influence of said field the magnetisation in the heated area is directed towards the external magnetic field. In this way a "nucleus" for a new magnetic domain is formed. This will grow under the influence of the magnetic field which remains activated for a few more microseconds, until it covers the entire light switching element, thereby again exhibiting a uniform magnetisation.

For the proper functioning of such a light switching element the amount of Faraday rotation, the compensation temperature and the lattice constant of the epitaxial layer, as well as the so-called uniaxial magnetic anisotropy $K_u$ of the layer material are of great importance. Experience has shown that epitaxy layers of bismuth-substituted yttrium or gadolinium iron garnet which are grown in (111)-direction, exhibit a substantial degree of positive, growth-induced anisotropy $K_u$ which in layers deposited from a melt increases as the bismuth content is higher. A positive growth-induced anisotropy $K_u$ ensures that the magnetisation vector is perpendicular to the layer surface, as is required for the proper functioning of the light switching element described above. On the other hand, in a thermomagnetic switching process the force which determines the preferred direction of magnetisation must be overcome by an external magnetic field. Due to the materials used so far for the production of known light switching elements, this so-called magnetic switching field is so large that it can only be provided by an external wire-wound coil which is provided around the magneto-optical islands by means of hybrid technology, and not by an integrated coil because its cross-section is too small, as a consequence of which the current density is raised.

As a separate production cycle is necessary for the manufacture of said coil, magneto-optical light switching elements are expensive and the electronic drive circuitry for producing the necessary high currents is relatively costly. A further disadvantage of the use of a separate wire-wound coil is that due to power dissipation in the coil wire the switching rate of the single light switching elements is limited to an array frequency of 2 kHz.

SUMMARY OF THE INVENTION

It is an object of the invention to so improve the magneto-optical light switching element mentioned in the opening paragraph, that its growth-induced anisotropy $K_u$, which determines the switching characteristics of the magneto-optical light switching element, is reduced without changing the Faraday rotation, and that its manufacture is simplified substantially.

This object is achieved in accordance with the invention in that the substrate is (100)-oriented and the coil is constructed as an integrated coil.

A method of manufacturing such a magneto-optical light switching element is characterized in that an epitaxial layer of a melt on the basis of bismuth-substituted rare earth metal iron garnet is deposited on a magnetically unordered, optically transparent, (100)-oriented garnet substrate, in that islands are formed from the epitaxial layer by means of a photolithographic process, in that an integrated heat resistor is provided on each island, and in that an integrated coil which surrounds the islands is subsequently provided on the substrate.

The invention makes use of the recognition that layers formed from melts, as used in the manufacture of the known magneto-optical epitaxy layers from bismuth-substituted rare earth metal iron garnet, utilizing a (111)-oriented magnetically unordered garnet substrate, exhibit a growth-induced magnetic anisotropy $K_u$ which is significantly less than that of (100)-oriented magnetically unordered garnet substrates, the values of the Faraday rotation and of the compensation temperature of the magnetic garnet material remaining unchanged.

The advantages of the present invention reside in particular in that owing to the reduced uniaxial anisotropy of the magneto-optical garnet material, whilst maintaining the Faraday rotation at the known high values, a relatively small external magnetic switching field suffices to overcome the force which determines the direction of magnetisation in a thermomagnetic switching process. Such a magnetic switching field can be produced by an integrated coil which is provided on the substrate by a photolithographic process. The possibility of using an integrated coil is very advantageous to, in particular, industrial-scale manufacture, in that at least sixty arrays with more than 500 magneto-optical light switching elements each can simultaneously be provided with a coil, thereby substantially reducing production costs. Moreover, thanks to a more favourable geometry (smaller distances to the light switching elements) of an integrated meander-shaped thin-film coil in comparison with a wire-wound coil, a desired magnetic switching field can be obtained with less than 50% of the coil current necessary for operating a wire-wound coil; as the power dissipation of an integrated coil is reduced accordingly, undesired heating of the light switching elements is reduced. The reduced growth-induced magnetic anisotropy provides the additional advantage of a further reduction in coil current.

BRIEF DESCRIPTION OF THE DRAWINGS

The invention will now be explained in more detail with reference to a drawing and an exemplary embodiment.

DETAILED DESCRIPTION OF THE PREFERRED EMBODIMENTS

Figure 1A:
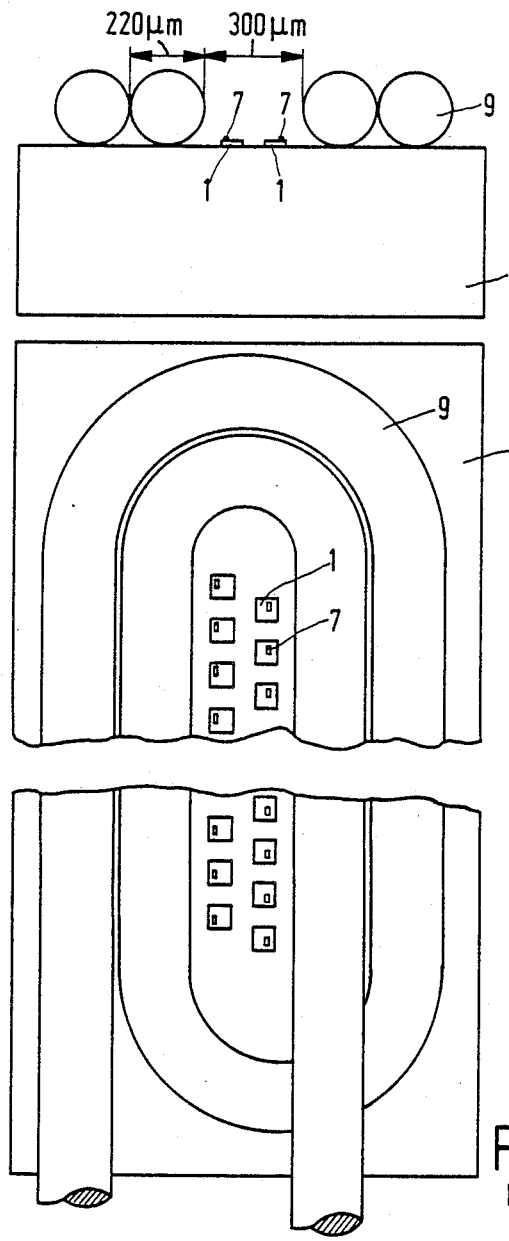
FIG. 1 is a sectional view and a plan view of a substrate having light switching elements with a external wire-wound coil.
FIG. 1b is a sectional view and a plan view of a substrate having light switching elements and an integrated thin-film coil.

By means of isothermal epitaxy on horizontally fixed rotating substrates, bismuth-substituted gadolinium iron garnet layers were deposited on (100)-oriented calcium magnesium zirconium-substituted gadolinium gallium garnet substrates (GGCMZ) having a lattice constant as $= 1.250$ nm. To this end, the temperature of the melt from which the epitaxial layers are grown is lowered to the growth temperature, after the melt has homogenised for several hours, and the substrate is fixed to a platinum support and positioned horizontally over the melt at a distance of 10 mm. After approximately three minutes the substrate has reached the required growth temperature and it is immersed 30 to 40 mm in the melt and rotated immediately, the direction of rotation being reversed every 2.5 s. To stop the growth process, the substrate is pulled out of the melt and any melt residue is largely spun off by a fast rotating movement. Epitaxial layers having a layer thickness of 5.5. $\mu$m were deposited on an approximately 0.5 mm thick substrate. Table I lists the composition of one of the melts used in this exemplary embodiment, the quantity of cations being indicated in at %. $T_S$ designates the saturation temperature.

TABLE I

| Pb | Bi | B | Fe | Gd | Ga | Al | $T_S$ (K) |
|---|---|---|---|---|---|---|---|
| 38.72 | 34.62 | 12.17 | 12.25 | 0.73 | 0.49 | 1.02 | 1093 |

Table II lists the composition, manufacturing parameters and properties of a layer grown in accordance with the melt of table I, in which (111)-oriented (state of the art) and (100)-oriented (invention) layers which are deposited on GGCMZ substrates are compared:

TABLE II

|  | $T_S$ (K) | $\Delta T_S$ (K) | $\|\Delta a^\perp\|$ (nm) | $T_K$ (K) | $\theta F$ (degree/cm) | d (/$\mu$m) | $K_u$ (J/m$^3$) |
|---|---|---|---|---|---|---|---|
| Layer $L_{111}$ |  |  |  |  |  |  |  |
| $Gd_{2.04}Bi_{0.96}Fe_{4.45}Ga_{0.20}Al_{0.35}O_{12}$ on a (111)-oriented Substrate | 1093 | 42 | <0.0005 | 269 | 15000 | 5.5 | $5.10^3$ |
| Layer $L_{100}$ |  |  |  |  |  |  |  |
| $Gd_{2.04}Bi_{0.96}Fe_{4.45}Ga_{0.20}Al_{0.35}O_{12}$ | 1093 | 44 | <0.0005 | 269 | 15000 | 5.5 | $1.5.10^3$ |

TABLE II-continued

| | $T_S$ (K) | $\Delta T_S$ (K) | $\|\Delta a^\perp\|$ (nm) | $T_K$ (K) | $\theta F$ (degree/cm) | d (/μm) | $K_u$ (J/m³) |
|---|---|---|---|---|---|---|---|
| on an (100)-oriented Substrate | | | | | | | |

$T_S$ = Saturation temperature
$\Delta T_S$ = supercooling
$|\Delta a^\perp|$ = lattice mismatch
$T_K$ = compensation temperature
$\theta F$ = Faraday rotation at a wavelength of 633 nm
d = Layer thickness
$K_u$ = growth-induced magnetic anisotropy constant The values listed in table II show that, although in one case a (111)-oriented substrate and in the other a (100)-substrate was used, the values of the Faraday rotation and of the compensation temperature are the same. This does not hold for the values of the growth-induced anisotropy $K_u$: the value of the inventive layer is substantially lower than that of the known layer.

Figure 1B:
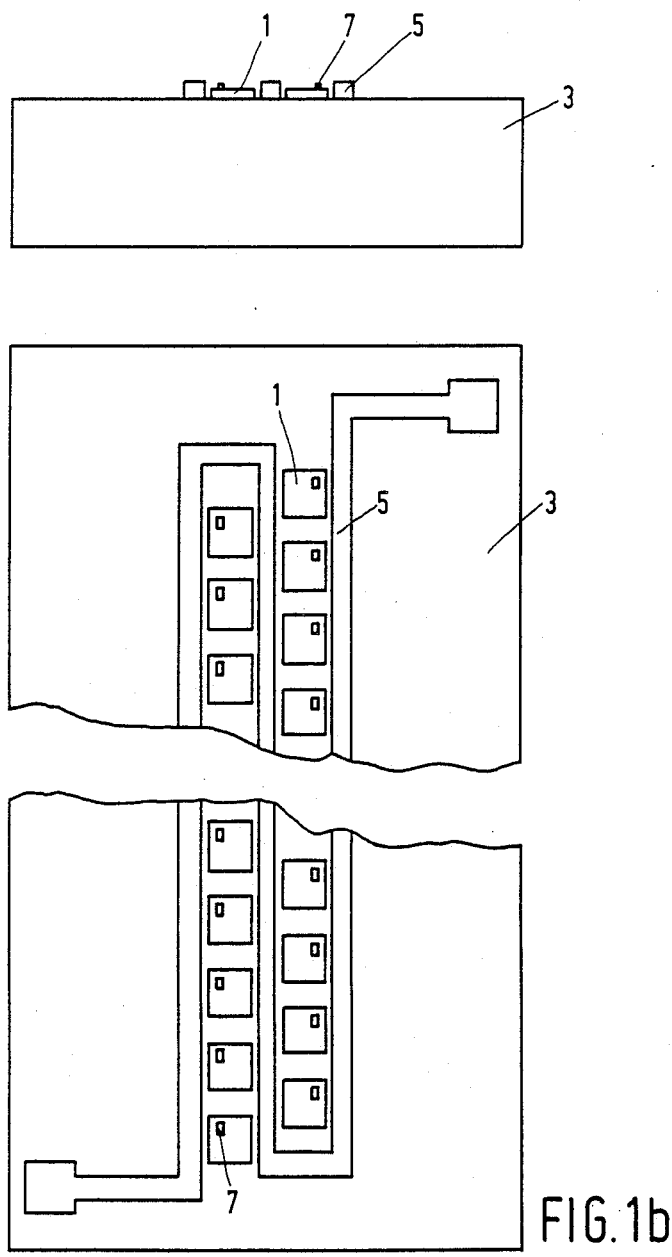

FIG. 1b is a sectional view and a plan view of parts of a magneto-optical light switching array having a plurality of magneto-optical light switching elements, which is provided on a magnetically unordered garnet substrate 3. By means of a photolithographic etching process, islands 1 having a border length of approximately 100 μm were etched from 5.5 μm thick, epitaxial, bismuth-substituted rare earth metal iron garnet layers which were manufactured as described above, which islands are surrounded by a meander-shaped coil 5 which is produced by means of thin-film technology and which has a layer thickness of 10 μm and a conductor-path width of approximately 50 μm. Heating resistors 7 which are manufactured by means of thin-film technology are provided on the islands 1. The switching parameters were measured at the location of the light switching array, as shown in detail in FIG. 1a, which contains a plurality of light switching elements and whose magnetic switching field was produced by means of a two-turn wire-wound coil 9.

Figure 2:
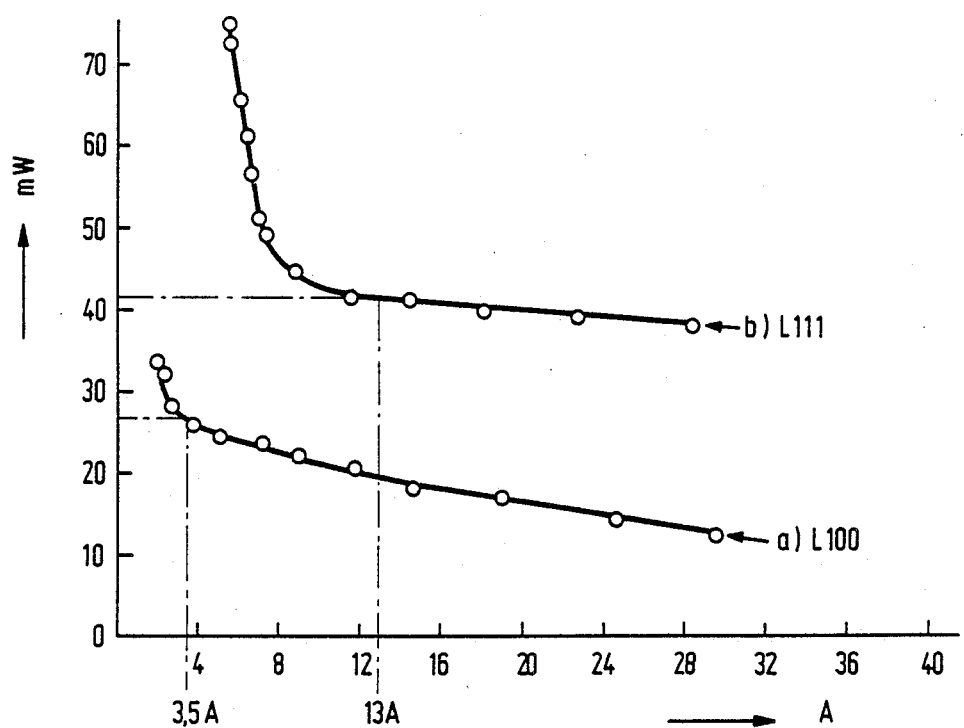
FIG. 2 is a diagram plotting the dependence of the heating capacity upon the current in an external wire-wound coil (a) for a magneto-optical light switching element in accordance with the invention, and (b) for a magneto-optical light switching element in accordance with the present state of the art.

In accordance with Table II, FIG. 2 depicts the thus measured switching characteristics of light switching elements having layers $L_{100}$ and $L_{111}$, the required heating capacity being shown as a function of the current in the magnetic coil. The coil current is plotted on the horizontal axis of the diagram and is indicated in A. The heating capacity is plotted on the vertical axis and is indicated in mW. The data are measured at 298° K. The heating pulse was 16 μsec. The magnetic pulse was also 16 μsec. The overlap was 2.5 μsec. Both layer materials exhibit a distinctive threshold value of the current in the magnetic coil. Below said threshold value the required heating capacity increases sharply. The light switching elements can be operated only at currents over said threshold value, because a greater heating capacity adversely affects the life cycle of the heating resistors.

FIG. 2 shows that the threshold value of the light switching element having the layer $L_{100}$ is situated at a coil-current level, which is substantially below that of a light switching element having a layer $L_{111}$ in accordance with the present state of the art. The light switching element with the layer $L_{111}$ necessitates a coil current of 13 A, whereas the light switching element with the layer $L_{100}$ in accordance with the invention can be switched with a coil current of 3.5 A. As there is a square-law relationship between the current and the power dissipation of the coil, there is at 3.5 A only 7% left of the original power dissipation. Moreover, the reduction in the necessary heating capacity results in a longer service life of the integrated heating resistors.

The possibility of using an integrated meander-shaped thin-film coil leads to a substantial reduction in power dissipation of the magnetic coil in comparison with a magnetic coil which is formed of wire turns. In the case of a conductor path width of 50 μm, a thickness of 10 μm, a length of 10.5 cm, a resistivity of $3.10^{-6}$ Ωcm and a current of 1.5 A, the integrated coil has a power dissipation of 1 W. This value relates to a light switching element with a layer $L_{100}$ having an array frequency of 3 kHz and a magnetic pulse width of 2×12 μs. The use of a light-switching element having a layer $L_{111}$ requires a current of 5.6 A for switching; this would lead to a power dissipation of ≈14 W, which gives rise to thermal-control problems in an integrated coil and to the destruction of the light switching array.

For this reason, the known light switching elements on the basis of a bismuth-substituted rare earth metal iron garnet layer which is provided on a (111)-oriented non-magnetic garnet substrate can only be switched by means of an external wire-wound coil which has a small resistance due to its relatively large wire cross-section and which can be operated with a sufficiently small power dissipation of ≈5 W.

What is claimed is:

1. A magneto-optical light switching element comprising:
   a magnetically unordered, optically transparent, (100)-oriented garnet substrate;
   a plurality of islands formed from an epitaxial layer on said substrate, said layer formed on the basis of bismuth-substrated rare earth metal iron garnet;
   a plurality of integrated heating resistors disposed on said plurality of islands; and
   an integrated coil formed on said substrate having turns which surround and are proximate to said islands, said integrated coil generating a magnetic flux which in combination with the heat produced by said heating resistors, controls light passage through said islands.

2. A magneto-optical light switching element as claimed in claim 1, characterized in that the substrate comprises rare earth metal gallium garnet.

3. A magneto-optical light switching element as claimed in claim 2, characterized in that the substrate comprises calcium magnesium zirconium-substituted gadolinium gallium garnet (GGCMZ) of the general formula $(Gd,Ca)_3(Ga,Mg,Zr)_5O_{12}$.

4. A magneto-optical light switching element as claimed in claim 2, characterized in that the substrate comprises calcium magnesium zirconium-substituted neodymium gallium garnet of the general formula $(Nd,Ca)_3(Ga,Mg,Zr)_5O_{12}$.

5. A magneto-optical light switching element as claimed in claim 1, characterized in that the epixtaxial layer comprises bismuth-substituted rare earth metal (SE) iron garnet in accordance with the general formula $(SE,Bi)_3(Fe,Ga,Al)_5O_{12}$.

6. A magneto-optical light switching element as claimed in claim 5, characterized in that the composition of the epitaxial layer is in accordance with the formula $Gd_{2.04}Bi_{0.96}Fe_{4.45}Ga_{0.20}Al_{0.35}O_{12}$.

7. A magneto-optical light switching element as claimed in claim 6, characterized in that the cation content, expressed in at. %, of the melt used to grow the epitaxial layer has the following values: Pb 38.72; Bi 34.62; B 12.17; Fe 12.25; Gd 0.73; Ga 0.49; Al 1.02.

8. A magneto-optical light switching element as claimed in claim 1, characterized in that the melt from which the epitaxial layer is grown contains lead oxide and boron oxide as a flux, said boron oxide containing a quantity of boron in the range from 6.5 to 12.7 at. % (cation content).

9. A method of manufacturing a magneto-optical light switching element comprising the steps of:
  providing a magnetically unordered, optically transparent (100)-oriented garnet substrate;
  depositing an epitaxial layer of a melt of a bismuth-substituted rare earth metal iron garnet on said substrate;
  forming islands from said epitaxial layer by a photolithographic process;
  providing an integrated resistor on each island; and
  providing on said substrate an integrated current carrying coil surrounding said islands.

10. A method as claimed in claim 9, characterized in that a rare earth metal gallium garnet is used as a substrate.

11. A method as claimed in claim 10, characterized in that a calcium magnesium zirconium-substituted gadolinium gallium garnet (GGCMZ) of the general formula $(Gd,Ca)_3(Ga,Mg,Zr)_5O_{12}$ is used as a substrate.

12. A method as claimed in claim 10, characterized in that a calcium magnesium zirconium-substituted neodymium gallium garnet of the general formula $(Nd,Ca)_3(Ga,Mg,Zr)_5O_{12}$ is used as a substrate.

13. A method as claimed in claim 9, characterized in that an epitaxial layer from bismuth-substituted rare earth metal (SE) iron garnet in accordance with the general formula $(SE,Bi)_3(Fe,Ga,Al)_5O_{12}$ is deposited on the substrate.

14. A method as claimed in claim 13, characterized in that an epitaxial layer having a composition in accordance with the formula $Gd_{2.04}Bi_{0.96}Fe_{4.45}Ga_{0.20}Al_{0.35}O_{12}$ is deposited on the substrate.

15. A method as claimed in claim 14, characterized in that said melt is used having the following cation content in at. %: Pb 38.72; Bi 34.62; B 12.17; Fe 12.25; Gd 0.73; Ga 0.49; Al 1.02.

16. A method as claimed in claim 9, characterized in that said melt used to grow the epitaxial layer, contains lead oxide and boron oxide as a flux, the quantity of boron being in the range from 6.5 to 12.7 at. % (cation content).

17. A method as claimed in claim 9, characterized in that the epitaxial layer is deposited with a layer thickness in the range from 1 to 10 $\mu$m.

18. A method as claimed in at least one of the claim 9, characterized in that islands having a border length up to 500 $\mu$m are formed from the epitaxial layer.

* * * * *